(12) United States Patent
Jones

(10) Patent No.: US 7,856,230 B1
(45) Date of Patent: Dec. 21, 2010

(54) SYSTEM AND METHOD FOR RECONNECTING DROPPED MOBILE TELEPHONE CALLS

(75) Inventor: Bryce A. Jones, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 979 days.

(21) Appl. No.: 11/100,052

(22) Filed: Apr. 6, 2005

(51) Int. Cl.
*H04W 4/00* (2009.01)
(52) U.S. Cl. .................................................. 455/422.1
(58) Field of Classification Search ................ 455/450, 455/455, 456, 423, 425, 435.1, 551, 442.1, 455/410, 414.1, 436, 437, 8, 9, 456.1–456.6; 379/201.01; 370/311, 252, 328
See application file for complete search history.

(56) References Cited

U.S. PATENT DOCUMENTS

| | | | | |
|---|---|---|---|---|
| 5,812,636 A | * | 9/1998 | Tseng et al. | 455/423 |
| 5,933,488 A | * | 8/1999 | Marcus et al. | 379/217.01 |
| 6,766,173 B1 | * | 7/2004 | Chun et al. | 455/450 |
| 2001/0021653 A1 | * | 9/2001 | Han | 455/450 |
| 2004/0157606 A1 | * | 8/2004 | Lee | 455/435.1 |
| 2004/0162070 A1 | * | 8/2004 | Baral et al. | 455/435.1 |
| 2005/0221815 A1 | * | 10/2005 | Okabe | 455/422.1 |

* cited by examiner

*Primary Examiner*—Melody Mehrpour

(57) ABSTRACT

The present invention provides a system and method for reconnecting a dropped mobile telephone call without input from the dropped party or the remaining party. In accordance with the present invention, the system determines that a call has been terminated abnormally, possibly due to an unsuccessful transition between cell towers. The system then initiates reconnection of the dropped party with the remaining party with no input from either party. The remaining party may optionally hear a recorded message while the call is reconnected.

14 Claims, 5 Drawing Sheets

SYSTEM AND METHOD FOR RECONNECTING DROPPED MOBILE TELEPHONE CALLS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to handling dropped mobile telephone calls. More particularly, the present invention relates to a system and method for reconnecting dropped mobile telephone calls using an automatic callback of the dropped party.

BACKGROUND OF THE INVENTION

Mobile telephones work well within the range of a single cell tower. But when the user's movement necessitates a change from one cell tower to a new cell tower, calls may be dropped during the transition between two towers. To solve the root cause of this dilemma requires improving the transition from one cell tower to another cell tower, an ongoing process for mobile telephone service providers. As cell tower transitions are improved, the present invention lessens the undesired impact of dropped calls by providing a service within the communication network that automatically reconnects the dropped call.

The same reconnection service may be useful in other wireless networks, such as 802.11b or 802.11g networks connecting into wire-based communication networks. These wireless links could be reconnected in a similar manner as the mobile telephone call in the event that the wireless link was terminated abnormally during a transition between two wireless access points.

SUMMARY OF THE INVENTION

The present invention provides a system and a method to automatically reconnect a dropped mobile call when the call is terminated abnormally, as when a mobile telephone call is interrupted by an unsuccessful transition between two cell towers. Optionally, a message may be provided to the remaining party while the reconnection is in progress.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and method for reconnecting a mobile telephone call when the call is terminated abnormally. An abnormal termination may occur, for example, when a mobile telephone is transferred from one cell tower to another cell tower during a call. While a transition from one cell tower to another cell tower is a common cause of an abnormal termination, the present invention may be applied to all abnormal terminations, not just those caused by tower transitions.

Figure 1:
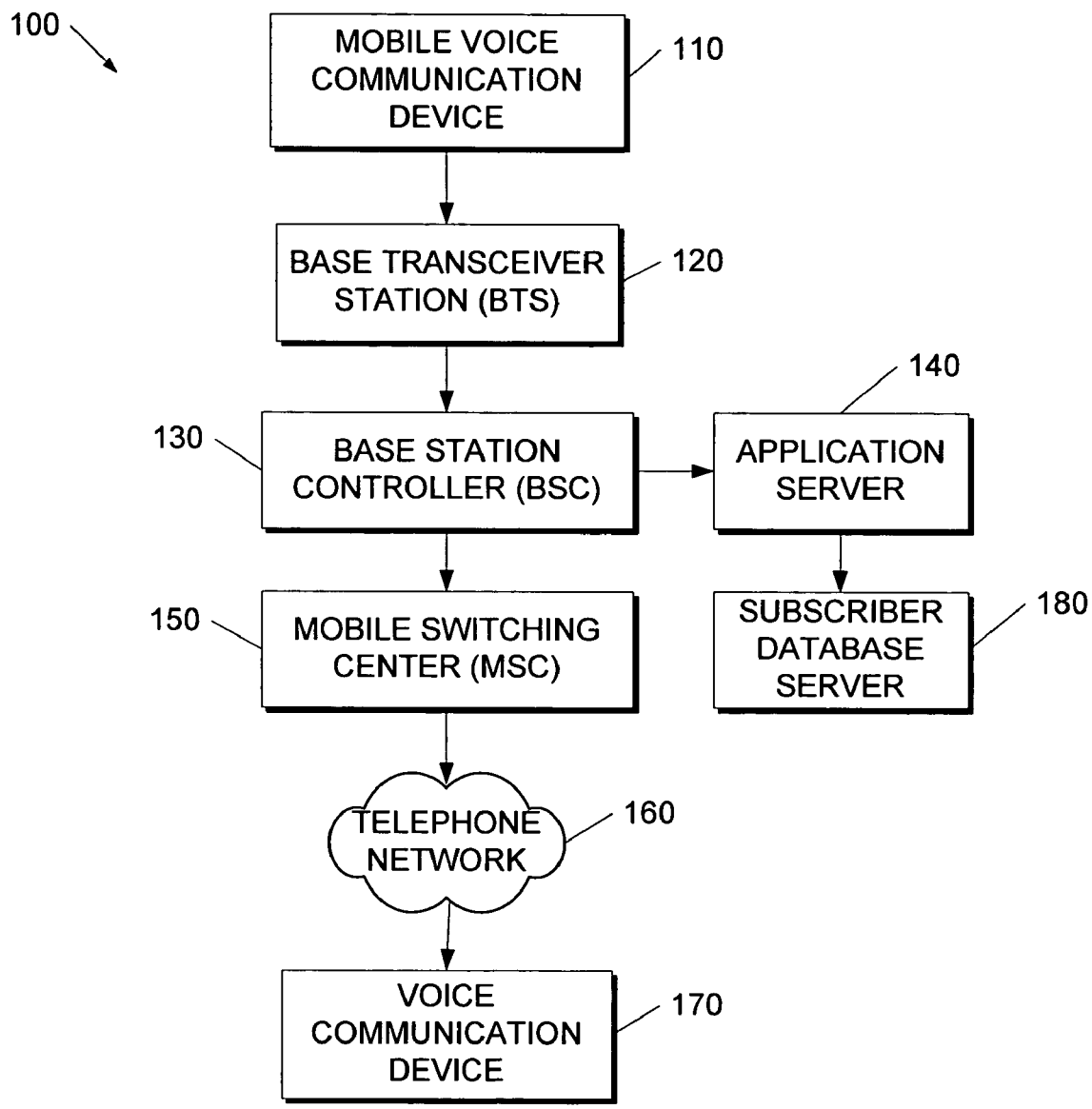
FIG. 1 illustrates a communication architecture in accordance with the present invention for a mobile telephone connection.

FIG. 1 illustrates a communication architecture 100 for a mobile telephone connection. A mobile voice communication device 110 may be connected to a base transceiver station (BTS) 120 via a wireless connection using, for example, radio waves. One skilled in the art will appreciate that mobile voice communication device 110 may possess capabilities beyond voice communication, such as wireless data capabilities and/or data management capabilities. BTS 120 is connected to a base station controller (BSC) 130. BSC 130 may connect to an application server 140. Application server 140 may comprise a computer server executing an operating system such as Microsoft Windows or a Unix operating system such as HP-UX, IBM AIX, Sun Solaris, although any computer operating system may be used. In the scenario where the reconnection service is offered as a subscription service, subscriber database server 180 may optionally connect to application server 140 to provide subscriber information to application server 140 in order to determine if the user is subscribed to the reconnection service. Subscriber database server 180 may comprise a computer server executing an operating system such as Microsoft Windows or a Unix operating system such as HP-UX, IBM AIX, Sun Solaris, although any computer operating system may be used. BSC 130 may connect to a mobile switching center (MSC) 150, which may also be referred to as a mobile serving switch. MSC 150 may connect to a telephone network 160. Telephone network 160 may be a circuit-based network, such as a public switch telephone network (PSTN), or a packet-based network. Telephone network 160 may connect to a voice communication device 170. Voice communication device 170 may be, for example, a mobile or landline telephone.

Figure 2:
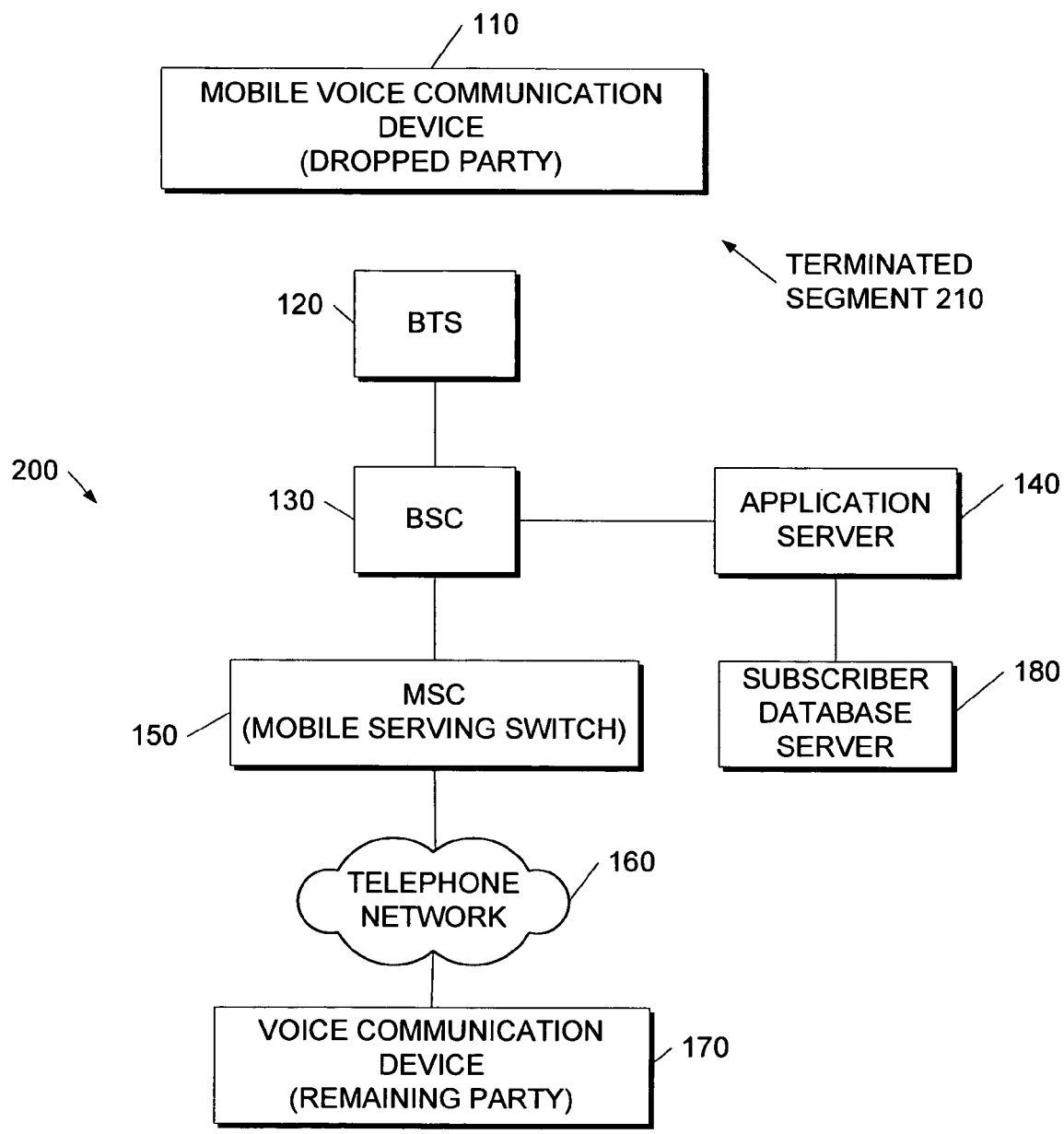
FIG. 2 illustrates a communication architecture in accordance with the present invention for an abnormally terminated mobile telephone connection.

FIG. 2 illustrates a communication architecture 200 for an abnormally terminated mobile telephone connection. When a telephone call is terminated, BSC 130 provides a termination code to MSC 150 indicating the type of termination. If one of the two parties voluntarily disconnects, the call is designated with a normal termination code. If the call is interrupted without either party voluntarily disconnecting, the call is designated with an abnormal termination code. When mobile voice communication device 110 is abnormally disconnected from the architecture of FIG. 1, mobile voice communication device 110 may be referred to as the dropped party. In FIG. 2, the terminated segment 210 occurs between mobile device 110 and BTS 120. BTS 120 may be connected to BSC 130, which may be connected to application server 140. BSC 130 may be further connected to MSC 150. MSC 150 may be connected through telephone network 160 to voice communication device 170. Voice communication device 170 becomes the remaining party of an abnormally terminated call. As in FIG. 1, voice communication device 170 may be a mobile or landline telephone. Either BSC 130 or application server 140 may determine if the connection was terminated abnormally and if terminated segment 210 is controlled by MSC 150. BSC 130 or application server 140 may also determine if the dropped party 110 subscribes to the reconnection service prior to initiating an action to reconnect dropped party 110. In the scenario where the reconnection service is offered as a subscription service, subscriber database server 180 may optionally connect to application server 140 to provide subscriber information to application server 140 in order to determine if the user is subscribed to the reconnection service. BSC 130 or application server 140 may also play a recorded message to remaining party 170 while reconnecting dropped party 110 to remaining party 170. The recorded message may indicate that remaining party 170 should hold on the line while dropped party 110 is reconnected. The recorded message may also contain advertisements, informational content, promotional material or public service announcements. The connection may be restored between the original BTS 120 and dropped party 110. Alternatively, the connection may be restored between a different BTS and dropped party 110, as in the case where the abnormal termination resulted from a transition between two towers.

Figure 3:
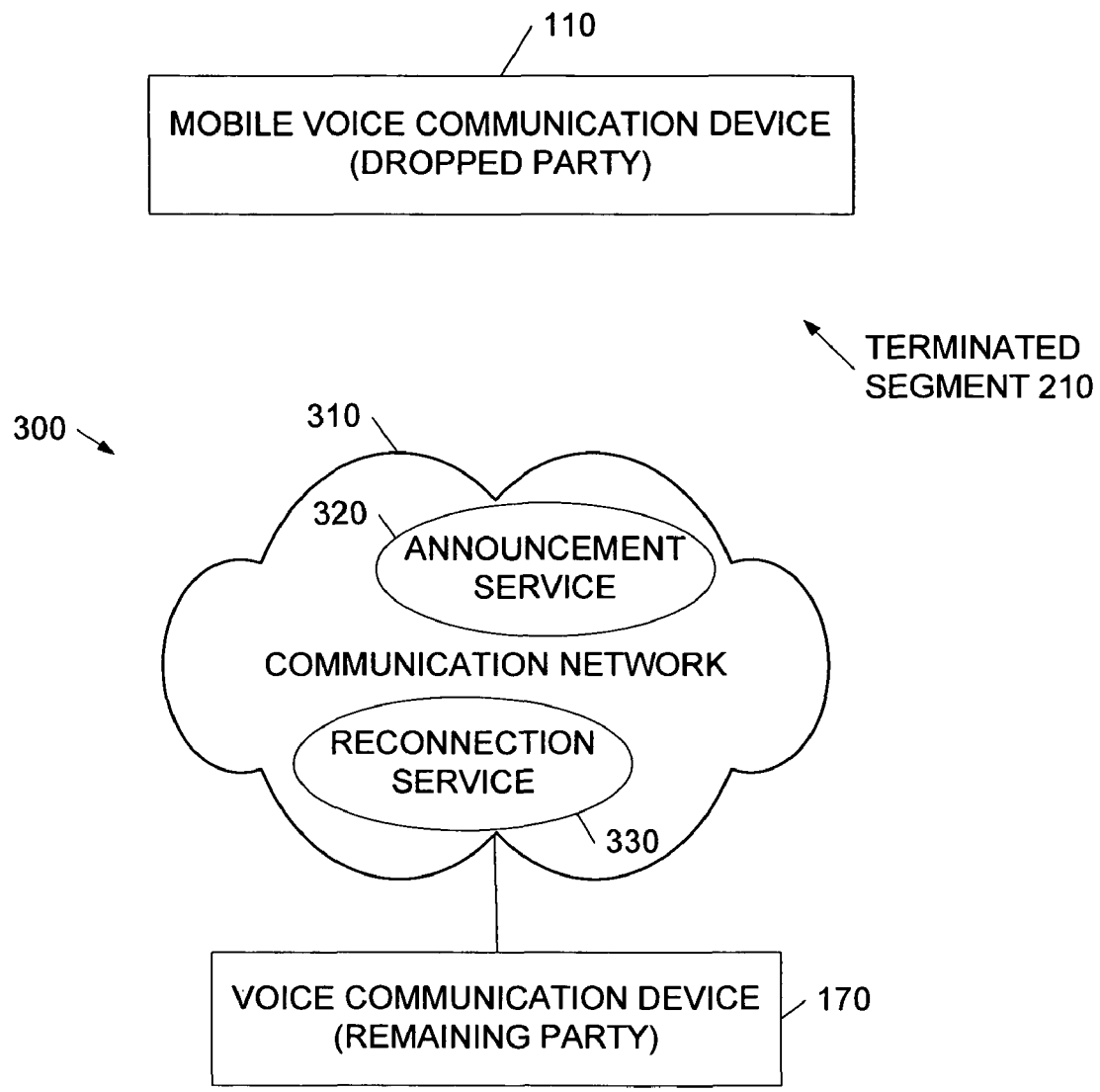
FIG. 3 illustrates a system architecture in accordance with the present invention for implementing a reconnection service.

Referring now to FIG. 3, a system architecture 300 for implementing the reconnection service of the present invention is described. The communication network 310 may contain services such as announcement service 320 and reconnection service 330. The communication network 310 may be configured similarly to the network in FIG. 1. Remaining party 170 is connected to communication network 310. Announcement service 320 may play a recorded message to remaining party 170 while reconnection service 330 is reconnecting dropped party 110. The recorded message may indicate that remaining party 170 should hold on the line while dropped party 110 is reconnected. The recorded message may also contain advertisements, informational content, promotional material or public service announcements. Communication network 310 may be packet-based or circuit-based at its core. At least one end of communication network 310 is equipped to connect mobile telephones as in FIG. 1.

Figure 4:
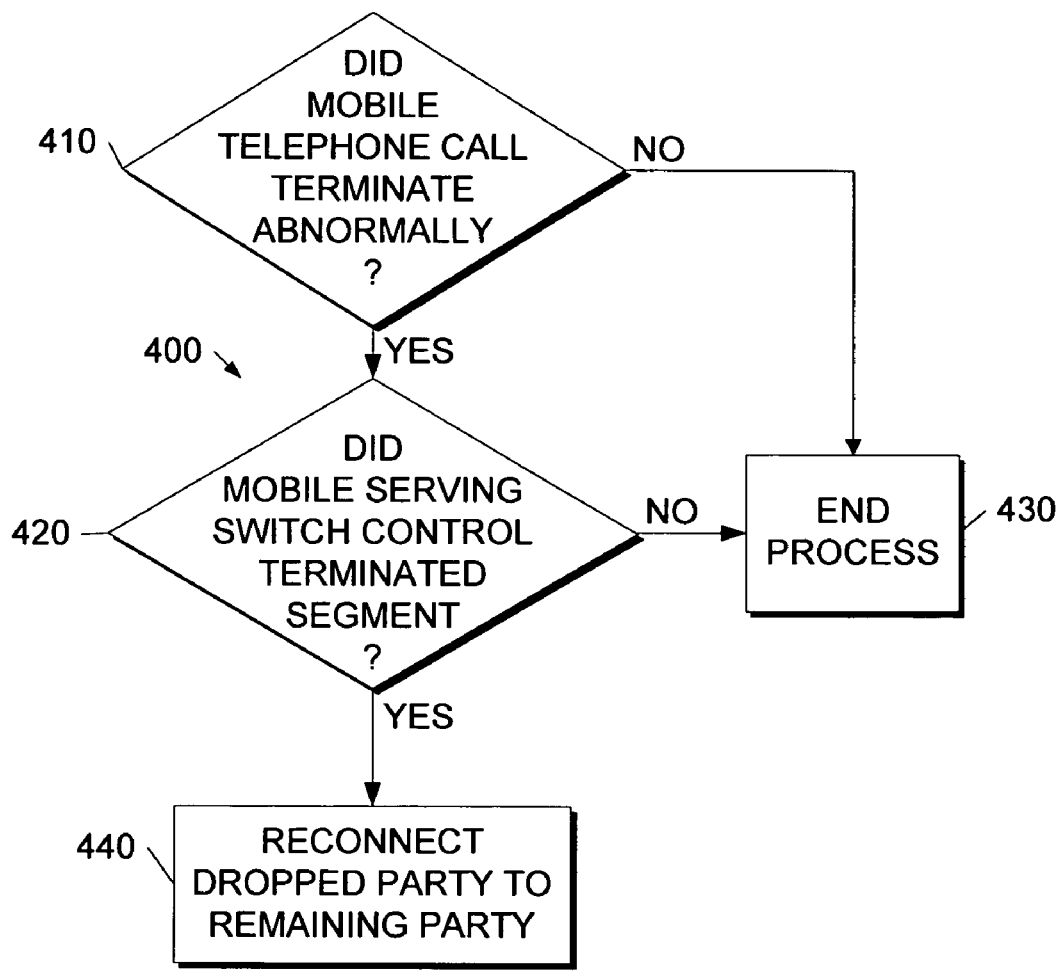
FIG. 4 illustrates a method in accordance with the present invention for implementing a reconnection service.

Referring now to FIG. 4, a method 400 in accordance with the present invention for implementing the reconnection service is illustrated. Method 400 may be performed in software hosted by BSC 130 or application server 140 illustrated in FIG. 1. In step 410 of method 400, BSC 130 or application server 140 determines if the mobile telephone call terminated abnormally. A call may be said to have terminated abnormally if either party did not voluntarily disconnect from the call. If the call did terminate normally, method 400 terminates at the end process step 430. If the call terminated abnormally, BSC 130 or application server 140 determines if mobile serving switch 150 controlled terminated segment 210 in step 420. If mobile serving switch 150 did not control terminated section 210, method 400 terminates at end process step 430. If mobile serving switch 150 did control the terminated section, dropped party 110 is reconnected to remaining party 170 in step 440. The connection may be restored between the original BTS 120 and dropped party 110. Alternatively, the connection may be restored between a different BTS and dropped party 110, as in the case where the abnormal termination resulted from a transition between two towers.

Figure 5:
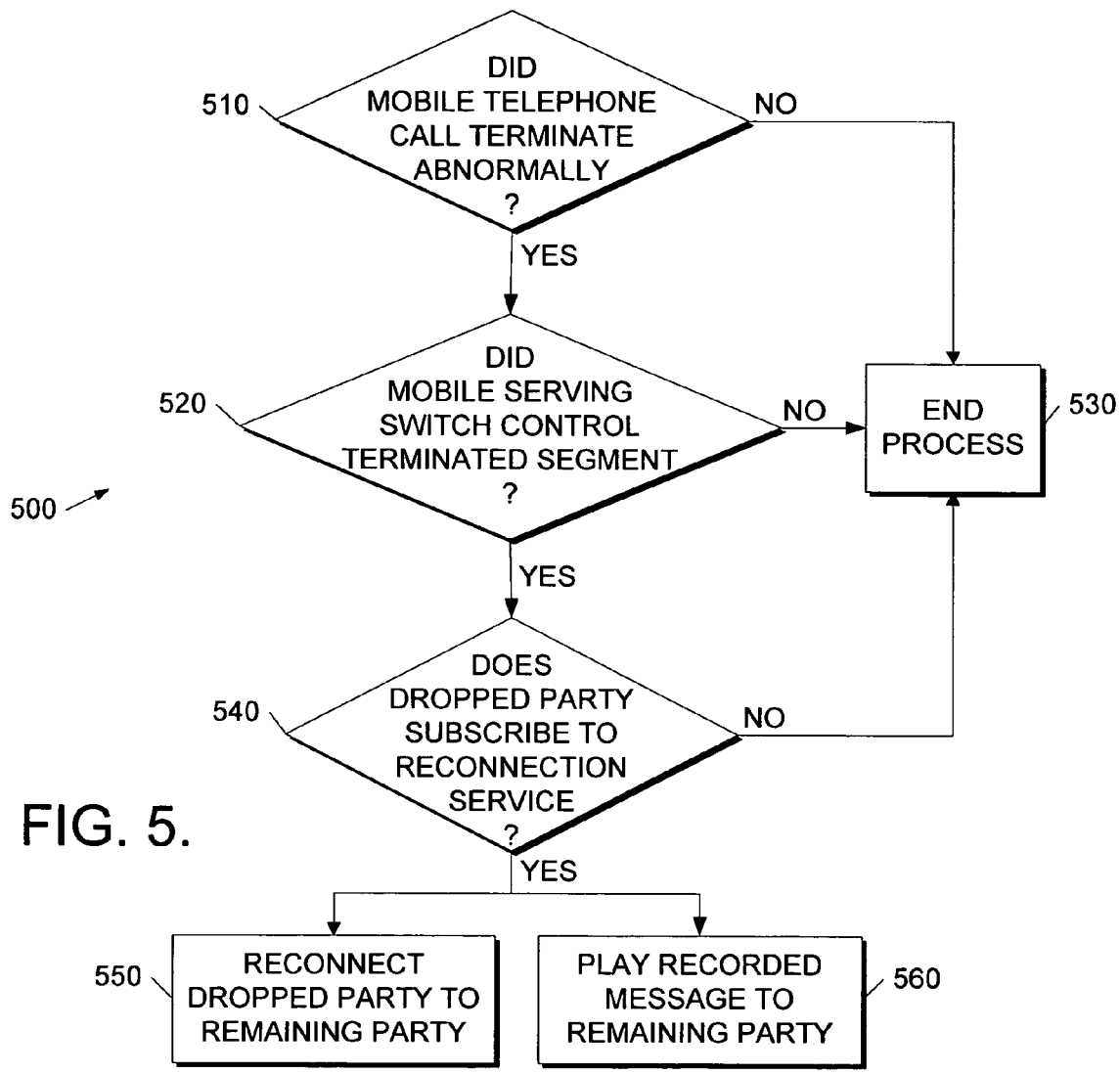
FIG. 5 illustrates a further method in accordance with the present invention for implementing a reconnection service.

Referring now to FIG. 5 a further method 500 in accordance with the present invention for implementing the reconnection service is illustrated. Method 500 may be performed in software hosted by BSC 130 or application server 140 illustrated in FIG. 1. In step 510 BSC 130 or application server 140 determines if the mobile telephone call terminated abnormally. A call may be said to have terminated abnormally if either party did not voluntarily disconnect from the call. If the call did terminate normally, method 500 terminates at the end process step 530. If the call terminated abnormally, BSC 130 or application server 140 determines if mobile serving switch 150 controlled terminated segment 210 in step 520. If mobile serving switch 150 did not control terminated section 210, method 500 terminates at end process step 530. If mobile serving switch 150 did control the terminated section, BSC 130 or application server 140 may optionally check if dropped party 110 subscribes to the reconnection service in step 540. If there is no subscription, method 500 terminates at end process step 530. If dropped party 110 subscribes to the reconnection service, dropped party 110 is reconnected to remaining party 170 in step 550. The connection may be restored between the original BTS 120 and dropped party 110. Alternatively, the connection may be restored between a different BTS and dropped party 110, as in the case where the abnormal termination resulted from a transition between two towers. Optionally, in step 560 a recorded message is played to remaining party 170 while the reconnection is in progress. This recorded message may indicate that remaining party 170 should hold the line while dropped party 110 is reconnected. The recorded message may also contain advertisements, informational content, promotional material or public service announcements.

Methods and systems, such as those described above, could also be applied to wireless networks, such as 802.11b or 802.11g networks. One skilled in the art would recognize that a wireless access point connected to a packet-based network could be analogous to BTS 120 connected to telephone network 160. In much the same way that a mobile telephone experiences a dropped call when transitioning between two cell towers, a wireless device may experience a dropped connection when transitioning between two wireless access points. The present invention could be used to reconnect the wireless device through the original or new wireless access point without action on the part of the dropped party. The recorded message may, in this case, be a text message displayed on the wireless device, but providing the same capabilities as described above.

What is claimed is:

1. The method for automatically reconnecting a dropped mobile telephone call comprising:
    recognizing a terminated segment, wherein the terminated segment comprises a mobile telephone call that has terminated abnormally resulting in a dropped party and a remaining party;
    determining whether the terminated segment was controlled by a mobile serving switch;
    determining whether the dropped party was subscribed to a reconnection service; and
    automatically reconnecting the remaining party to the dropped party without input from either the dropped party or the remaining party when the terminated segment was controlled by the mobile serving switch and the dropped party was subscribed to the reconnection service.

2. The method for reconnecting a dropped mobile telephone call of claim 1, further comprising playing a recorded message to the remaining party.

3. The method for reconnecting a dropped mobile telephone call of claim 2 wherein the recorded message comprises a message to hold while the call is reconnected.

4. The message for reconnecting a dropped mobile telephone call of claim 2, wherein the recorded message comprises advertisement, informational content, promotional material or public service announcement.

5. A system for reconnecting a dropped mobile telephone call, the system comprising:
- a mobile voice communication device;
- a second voice communication device;
- a communication network connecting the mobile voice communication device and second voice communication device; and
- a reconnection service within the communication network that initiates the reconnection between the mobile voice communication device and the second voice communication device when the connection is terminated abnormally, wherein the reconnection is automatically initiated without input from either the mobile voice communication device or the second voice communication device when the connection is terminated abnormally by the mobile switching center.

6. The system for reconnecting a dropped mobile telephone call of claim 5, further comprising an announcement service to play a recorded message to the second voice communication device while the call is reconnected.

7. The system for reconnecting a dropped mobile telephone call of claim 6, wherein the recorded message comprises a message to hold while the call is reconnected.

8. The system for reconnecting a dropped mobile telephone call of claim 6, wherein the recorded message comprises advertisement, informational content, promotional material or public service announcement.

9. The system for reconnecting a dropped mobile telephone call of claim 5, wherein the reconnection service is performed by a base switch controller.

10. The system for reconnecting a dropped mobile telephone call of claim 5, wherein the reconnection service is performed by an application server.

11. At least one computer readable media having embodied thereon computer readable code for causing a computer to perform a method for reconnecting a dropped mobile telephone call, the method comprising:
- recognizing a terminated segment, wherein the terminated segment comprises a mobile telephone call that has terminated abnormally resulting in a dropped party and a remaining party;
- determining whether the terminated segment was controlled by the mobile serving switch;
- determining whether the dropped party was subscribed to a reconnection service; and
- automatically reconnecting the remaining party to the dropped party without input from either the dropped party or the remaining party when the terminated segment was controlled by the mobile serving switch.

12. At least one computer readable media of claim 11, wherein the method further comprises playing a recorded message to the remaining party while the call is reconnected.

13. At least one computer readable media of claim 12, wherein the recorded message comprises a message to hold while the call is reconnected.

14. At least one computer readable media of claim 12, wherein the recorded message comprises advertisement, informational content, promotional material or public service announcement.

* * * * *